OR 3,317,267

X 4075 7

May 2, 1967 A. OFFNER 3,317,267

OPTICAL SYSTEM HAVING CYLINDRICAL POWER

Filed April 12, 1963 2 Sheets-Sheet 1

INVENTOR.
Abe Offner

BY Daniel R Levinson

ATTORNEY.

INVENTOR.
Abe Offner

BY

Daniel R Levinson

ATTORNEY

United States Patent Office 3,317,267 Patented May 2, 1967

3,317,267
OPTICAL SYSTEM HAVING CYLINDRICAL POWER

Abe Offner, Darien, Conn., assignor to The Perkin-Elmer Corporation, Norwalk, Conn., a corporation of New York Filed Apr. 12, 1963, Ser. No. 272,618
6 Claims. (Cl. 350—181)

Figure 1A:
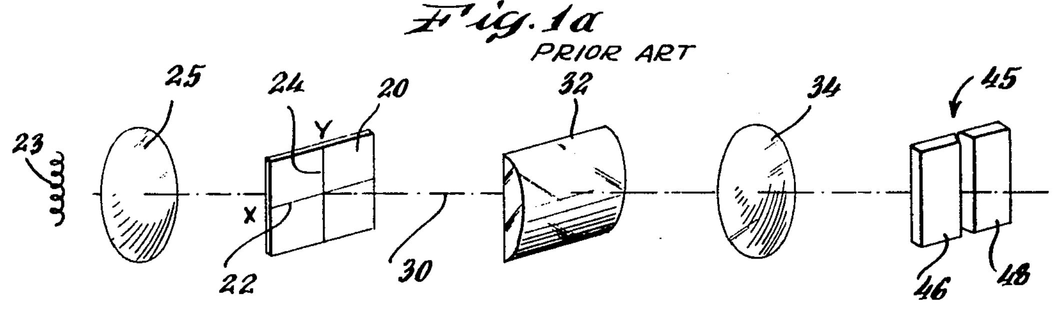
Fig. 1a PRIOR ART

This invention relates to optical systems which include members having cylindrical dioptric power, that is, dioptric power which varies from a maximum in a set of planes parallel to a first plane which contains the optical axis, to zero dioptric power in a set of planes parallel to a second plane which contains the optical axis and is perpendicular to said first plane. For the purpose of this invention it will be convenient to call one of the two above mentioned planes which contains the optical axis "horizontal," and the other of the two planes which contains the optical axis and is perpendicular to the horizontal plane "vertical." It is understood that the terms "horizontal" and "vertical" as used in this specification have no relation to the plane of the horizon and are merely used for convenience to denote two planes which are perpendicular to each other as defined above. A plane of interest perpendicular to the optical axis will be intersected by the horizontal and vertical planes in a pair of perpendicular lines. The imagery of lines parallel to the intersection of the horizontal plane and the plane of interest will be referred to as "imagery in the horizontal plane," and the imagery of lines parallel to the intersection of the plane of interest and the vertical plane will be referred to as "imagery in the vertical plane."

More particularly, this invention relates to optical systems which include members having cylindrical power in which the imagery in one plane, e.g. the vertical plane, must be corrected for a considerable field while in the other plane, i.e. the horizontal plane, there is a relatively small field.

Although the invention is specifically illustrated and described in a form suitable for use in an optical data processor, the invention is not actually limited to such use. In such optical data processors as more fully described and explained in an article by L. J. Cutrona et al. in IRE Transactions on Information Theory—6 (June 1960) pages 386–400, it is sometimes desirable to focus all the light passing through each horizontal line in a first plane of interest into a corresponding point (that is, a region of very small dimensions) in a second plane of interest so that the entire first plane of interest is imaged onto a vertical line or slit in the second plane of interest. In the past, optical systems for accomplishing this have consisted of a cylindrical lens whose cylinder axis is horizontal, located so that the first plane of interest is at its front focal plane, and followed by a spherical lens with the second plane of interest located at its rear focal plane. With such an optical system, in the vertical plane the first plane of interest is collimated by the cylindrical lens and then brought to a focus in the second plane of interest by the spherical lens so that in this plane lines are imaged as lines. Since a cylindrical lens with its cylinder axis horizontal has no power in the horizontal plane, collimated light passing through the first plane of interest will remain collimated in the horizontal plane after passing through the cylindrical lens and will be brought to a focus in the second plane of interest by the spherical lens. In the horizontal plane the system thus forms a point image and the entire first plane of interest is imaged on to a vertical line in the second plane of interest.

In such optical systems the cylindrical lens has to be corrected for an appreciable field, the length of the line image, while in the plane in which its dioptric power is zero, there is a negligible field, the width of the line image. This has resulted in a requirement for cylindrical lenses comparable in complexity to spherical anastigmats. Such lenses are much more difficult to manufacture than are spherical lenses and in the past this has limited the performance and design of such optical systems.

In accordance with the present invention, these difficulties are greatly reduced by substituting for the cylindrical lens with its axis horizontal, a spherical lens used in conjunction with a cylindrical lens whose cylinder axis is vertical and whose dioptric power is such that the net dioptric power of the spherical and cylindrical lens in the horizontal plane is zero. This results in a greatly simplified cylindrical lens since its dioptric power is in the plane in which there is essentially no field so that it need be corrected only for axial aberrations.

Obviously, the invention is not limited solely to the modification of the particular system hereinafter more fully described in its unmodified and then improved form, but rather in its broader aspects comprises the analogous improvement of any high quality optical system in which a cylindrical element is used as a component and in which there is a plane in which imagery must be corrected for a small field.

An object of the invention is the provision of an optical system of extremely high quality which comprises both cylindrical and spherical elements.

A further object of the invention is the provision of such an optical system which is essentially diffraction limited.

Another object of the invention is the provision of such a high quality optical system which is both practical and reasonably economical to manufacture.

Figure 1B:
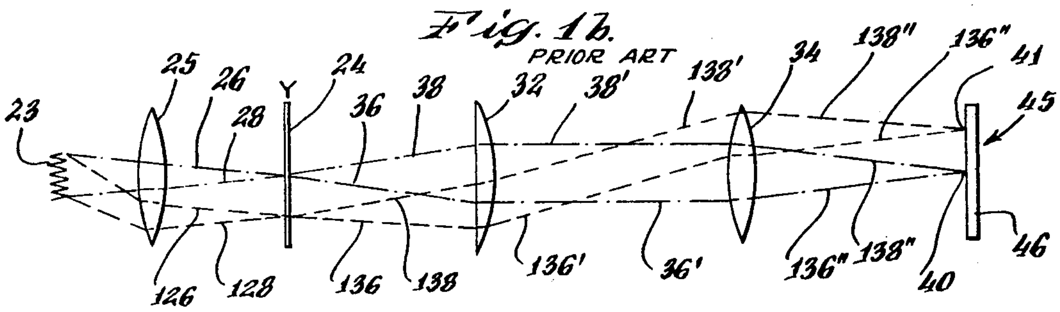
Fig. 1b. PRIOR ART
Figure 1C:
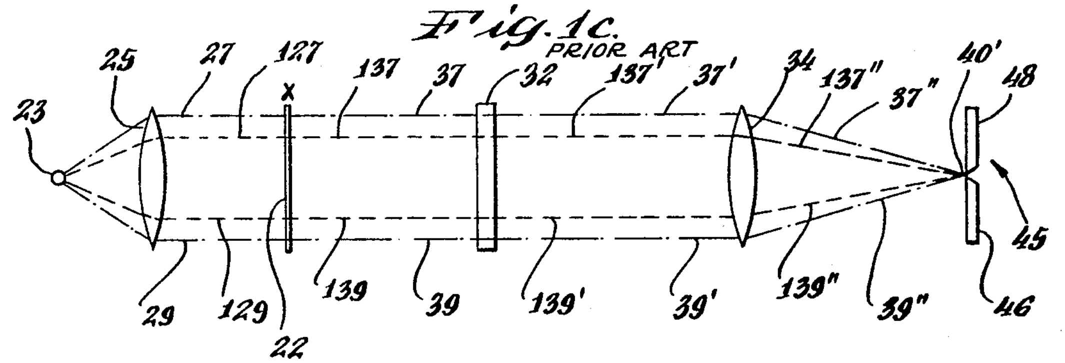
Fig. 1c. PRIOR ART
Figure 2A:
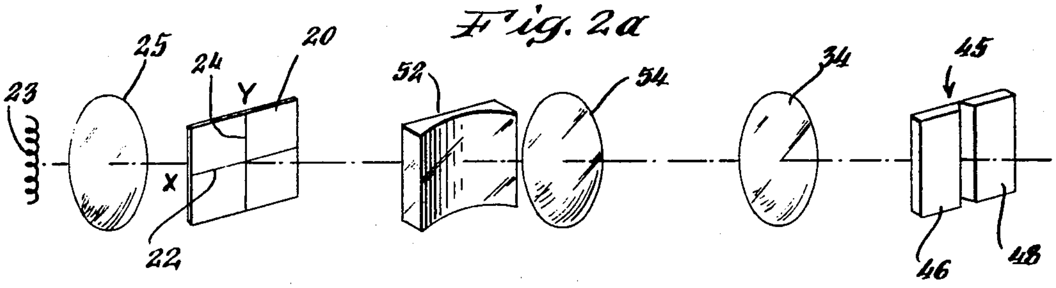
Figure 2B:
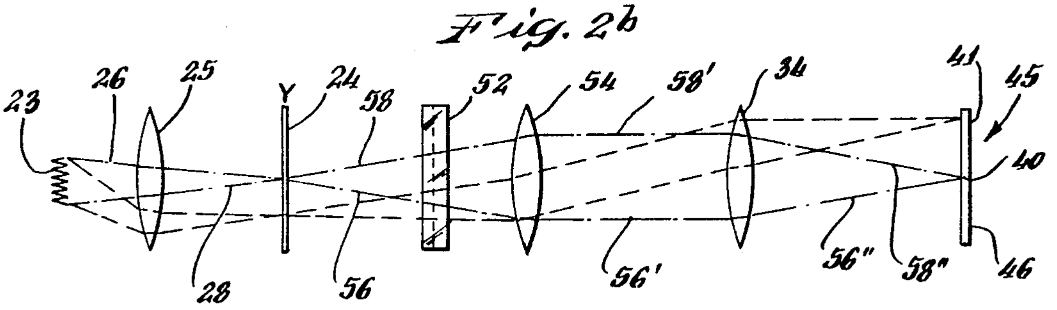
Figure 2C:
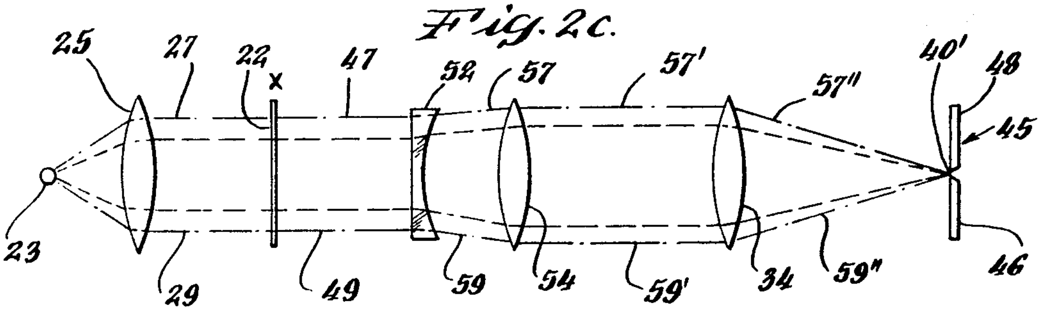
Figure 3:
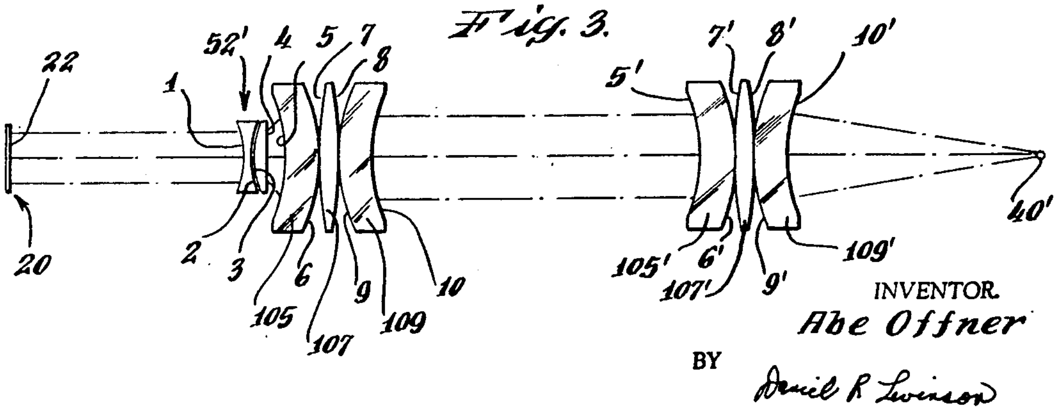

Other objects and advantages of the invention will be obvious to one skilled in the art upon reading the following specification in conjunction with the accompanying drawing in which:

FIGURE 1*a* is a partly diagrammatic perspective view of a prior art optical system;

FIGURE 1*b* is a partially diagrammatic side elevation of the optical system illustrated in FIGURE 1*a*;

FIGURE 1*c* is a partially diagrammatic plan view of the optical system shown in FIGURE 1*a*;

FIGURE 2*a* is a partially diagrammatic perspective view of the optical system of FIGURE 1*a* as improved by the present invention;

FIGURE 2*b* is a partially schematic side elevation view of the inventive optical system illustrated in FIGURE 2*a*;

FIGURE 2*c* is a partially schematic plan view of the inventive optical system shown in FIGURE 2*a*; and FIGURE 3 is a plan view of a specific form of the optical components which may be utilized in the invention.

In FIGURE 1*a* an object, represented by plane 20 is illustrated as containing co-ordinate reference axes X (in the horizontal direction) and Y (in the vertical direction), as illustrated at 22 and 24 respectively. These axes, which are illustrated solely for the purposes of explanation and are not necessarily contained in the object, have their origin on the optical axis 30 of an optical system composed of cylindrical lens component 32 and spherical lens component 34. Object 20 may be a photographic film or transparency and is shown illuminated by a linear light source 23 which lies in the vertical plane (which contains the Y axis) and is at the front focal plane of the condenser 25. The plane containing the Y axis 24 and the optical axis 30 is the vertical plane and the plane containing the X axis 22 and the optical axis 30 is the horizontal plane. The imagery of lines or strips of the object 20 which are parallel to the Y axis is imagery in the vertical plane as defined above. The imagery of lines or strips of the object 20 which are parallel to the X axis is imagery in the horizontal plane as defined above. As seen in FIGURE 1*b*, due to the length of the light source 23, there is a divergent beam coming from each point in the vertical plane, which divergent beam is formed into one of a series of parallel beams by lens 25, as illustrated by rays 26, 28, 126 and 128. On the other hand the light source 23 will appear as a point source in the plan view of FIGURE 1*c* so that in the horizontal plane object 20 is illuminated by collimated light (see rays 27, 29, 127 and 129). As best seen from FIGURE 1*b*, in the vertical plane the object 20 is collimated by cylindrical lens component 32 as shown by the collimation of rays 36 and 38 (and rays 136 and 138) to form collimated rays 36' and 38' (and 136' and 138'). This is accomplished by choosing the power of cylindrical lens 32 so that the object 20 is in its front focal plane and orienting cylindrical component 32 so that its cylindrical power is in the vertical plane. Spherical lens component 34 will then bring these collimated rays to a focus, as illustrated by rays 36'' and 38'' and (136'' and 138''). Rays 36 and 38 originating at the central level of object 20 will come to a focus on the optical axis at point 40 in the focal plane of lens 34. Rays originating from levels above or below the central level of object 20 will come to a focus below or above point 40 in the focal plane of lens 34. Thus rays 136 and 138 converge at the point 41.

In the horizontal plane as can be seen from FIGURE 1*c*, collimated light from the object 20 is unaffected by the cylindrical component 32 since it has no power in this plane. This is shown in the figure by the rays 37, 39 and 37', 39' (and 137, 139 and 137', 139'). All of these rays are then brought to a focus at the point 40' by the spherical lens 34 as indicated by the rays 37'', 39'' and 137'', 139''. Thus, light gathered from each horizontal line of the object 20 is brought to a focus at a point whose position along the slit 45 (formed by knife-edge masks 46 and 48) depends on the level of the horizontal line in the object 20 from which it originated. The degree to which the horizontal levels in object 20 remain separated at slit 45 depends on the combined imagery of cylindrical component 32 and spherical component 34. Both the cylindrical component 32 and the spherical component 34 must therefore have anastigmatic correction. The cylindrical component 32 must therefore be comparable in complexity to the spherical anastigmat 34. Since cylindrical lenses are much more difficult to manufacture than comparable spherical lenses, this results in a great increase in the cost of a system of a givn complexity. In addition up to now cylindrical lenses have not been manufactured as precisely as the best spherical lenses. Furthermore, spherical anastigmats can sometimes be made less complicated at the same time that their performance is improved by the judicious use of aspheric surfaces. At the present time, there is no comparable step that can be taken in the case of cylindrical lenses. For these reasons, the number of corrective techniques, and therefore the performance of such optical systems have been limited up to now.

The present invention obviates this difficulty by replacing the positive cylindrical lens component 32 by a cylindrical component of negative power and a positive spherical lens. The improved optical system is illustrated in FIGURE 2*a* as composd of the same elements previously described except that cylindrical lens component 32 has been replaced by negative cylindrical component 52 and spherical lens component 54. As may be seen in this figure, the negative cylindrical component is oriented so that its power is in the horizontal plane as contrasted to cylindrical lens 32 of FIGURE 1*a* which is oriented so that its power is in the vertical plane. The dioptric cylindrical power of the lens 52 is substantially equal (except as to sign) to that of lens 32 and the positive (spherical) dioptric power of lens 54 is substantially equal (but of opposite sign) to the cylindrical power of lens 52. For this reason, as shown in FIGURE 2*b*, rays traveling in the vertical plane will be collimated by the combined action of elements 52 and 54 in substantially the same manner as occasioned by lens 32 in FIGURE 1*b*. Thus, rays 56 and 58 will pass through cylindrical lens 52 so as to emerge therefrom in directions parallel to the direction at which they are incident thereon. In other words, lens 52 has no power in this plane. Therefore, the converging power of lens 54 will cause these diverging rays to be collimated as illustrated at 56' and 58'. Spherical lens 34 will then focus rays 56'' and 58'' to the same point 40 in a manner similar to that previously described in FIGURE 1*b*. Although cylindrical lens component 52 will have some effect (analogous to the effect of a plane parallel plate in non-parallel rays) on the rays traveling in the vertical plane nevertheless the position and other optical characteristics of lens 54 may be obviously adapted to compensate for this secondary effect.

Rays contained in the horizontal plane are affected by cylindrical lens component 52 and spherical lens component 54 so as to produce an overall result analogous to that illustrated in FIGURE 1*c*. Thus, in FIGURE 2*c* rays 47 and 49, which are contained in the horizontal plane and are parallel both to each other and the optical axis will initially be diverged by cylindrical component 52 as illustrated at 57 and 59. On passing through spherical lens component 54 these rays will be converged so as to emerge as parallel rays 57' and 59' (so as to be analogous to rays 37' and 39' in FIGURE 1*c*). These rays will then be converged by lens 34 as rays 57'' and 59'' so as to pass through slit means 45 as indicated by their crossover point 40'. Thus, the optical system illustrated in FIGURES 2*a* through 2*c* is functionally similar to the optical system illustrated in FIGURES 1*a* through 1*c*. However, as a practical matter there flow great advantages from utilizing the improved system schematically illustrated in FIGURES 2*a* through 2*c*.

This advantage comes about because in the optical systems of FIGURES 2*a* through 2*c*, only the spherical components 54 and 34 have power in the vertical plane in which they must be corrected for performance over a field. The cylindrical lens 52 has substantially zero field of view in the direction in which it contains its cylindrical power. In other words, in distinction to FIGURE 1*b* wherein cylindrical component 32 must have a relatively large field angle in the same direction in which it has its cylindrical power, cylindrical lens component 52 (see FIGURE 2*c*) has its power along that direction in which it need not have a large field angle. Conversely, as seen in FIGURE 2*b*, cylindrical lens component 52 need have no power in that direction in which it must have a large field angle. In this manner the practical difficulty of providing a cylindrical component which exhibits power in the same direction in which it must be corrected for a large field angle is obviated.

A specific example of a lens form which may be utilized in the FIGURES 2*a* through 2*c* optical system is shown in FIGURE 3. The negative cylinder (a doublet) corresponds to cylindrical lens 52 and is accordingly referenced 52'. Similarly, spherical triplet 54' corresponds to lens 54 in FIGURES 2*a* through 2*c*, and spherical triplet 34' to lens 34. The second spherical lens 34' is identical in every way to the spherical triplet 54'. Cylindrical doublet 52' is composed of a biconcave element 101, having a front and rear surface at 1 and 2, respectively. A plano-convex second element 103 is slightly air-spaced therefrom and forms the other element of the cylindrical lens. The front and rear surfaces of this element are referenced 3 and 4. The radii of curvature of the three cylindrical surfaces 1, 2, and 3, their thickness and spacing are given in the table below. Spherical triplet 54' is spaced behind cylinder 52' and is symmetrical. Thus, the first (105) and third (109)

elements are identical (weakly) negative meniscus elements (except as to orientation). Similarly, the central positive element is a symmetrical biconvex element (i.e., its surfaces 7 and 8 have the same curvature). The first surface 5 of element 105 and the corresponding outer surface 10 of element 109 are both figured (i.e., aspherical) in order to accomplish the objective of elimination of all aberrations contributing any image defects of a greater magnitude than caused by diffraction phenomena. In other words, the lens system is diffraction limited. The object is at the front principal focal plane of lens 54', and the image is at the back principal focal plane (the same distance) behind the other identical spherical lens. Thus, the entire spherical lens system, as well as each spherical component thereof, is symmetrical. Since these triplets are identical and spaced apart a distance equal to twice the focal length, lateral aberrations will be cancelled or balanced out. To show the identical correspondence of lens 54' and 34', the three elements and the six optical surfaces of the latter are numbered in the same manner as the corresponding parts of lens 54, except that they are primed.

The radii of curvature and the thickness (and spacing) of (or between) the various elements of the lens system are given in the table immediately below. The object is 534.6 mm. in front of the center of spherical surface 5 and the image is formed at this same distance behind the last surface 10', neglecting the slight effect (like a plane parallel plate) of the cylindrical lens 52' on the object rays. All the glasses used in this system have an index of refraction of 1.62 for the particular wave length of monochromatic light intended to be used with this system. All dimensions are given in millimeters.

Surface 10 to surface 5'=1,069.2
Back focal length=534.6

| Surface | Radius | Glass Thickness | Air Spacing |
|---|---|---|---|
| CYLINDRICAL | | | |
| 1 | −290.97 | 12.2 | |
| 2 | +197.14 | | 0.6 |
| 3 | +194.07 | 12.2 | |
| 4 | (plane) | | 34.6 |
| SPHERICAL | | | |
| 5 (5') | [1] −135.71 | 37.3 | |
| 6 (6') | −160.45 | | 0.1 |
| 7 (7') | +617.83 | 18.1 | |
| 8 (8') | −617.83 | | 0.1 |
| 9 (9') | +160.45 | 37.3 | |
| 10 (10') | [2] +135.71 | | |

[1] Aspheric: $x = -135.71 + \sqrt{(135.71)^2 - y^2} - 9.354 \times 10^{-11} y^4 + 4.306 \times 10^{-14} y^6 + 5.177 \times 10^{-19} y^8$

[2] Aspheric: $x' = +135.71 - \sqrt{(135.71)^2 - y^2} + 9.354 \times 10^{-11} y^4 - 4.306 \times 10^{-14} y^6 - 5.177 \times 10^{-19} y^8$ wherein $x$ and $y$ are the Cartesian coordinates of the aspheric surfaces 5, 5', having its origin (i.e., $x=0$ and $y=0$) at the center of the surface (i.e., where the optical axis meets the lens surface) with the $x$ axis coincident with the optical axis, and the $y$ axis perpendicular thereto. Similarly, $x'$ and $y'$ are the Cartesian coordinates defining surfaces 10 and 10, with $x'$ being 0 at the center of these surfaces (where the optical axis meets surfaces 10, 10').

Although the invention is illustrated as applied to the particular optical system of the type shown in FIGURES 1*a* through 1*c*, the invention is obviously not limited to adoption in such an optical system. Therefore, although FIGURES 2*a* through 2*c* illustrate the invention as utilized in a particular environment, the invention itself is not limited to such use and therefore is not restricted to the particular configuration of these last mentioned figures. Thus, in its broadest aspects the invention may be epitomized by the use of a cylindrical lens of one type of power (either negative or positive) and a spherical lens of the opposite power (positive or negative) to replace a cylindrical lens of a power opposite to that of the substituted cylindrical lens and oriented at right angles to it, in which the power plane of the original cylindrical lens (i.e., the plane perpendicular to the generatrix) contains a greater required field angle than the plane perpendicular thereto. Thus, in FIGURE 1*a*, the original positive cylindrical lens 32 had its power plane vertical, and this same vertical plane contains the large field angle (see FIGURE 1*b*). The substituted negative cylindrical lens 52 has its power in the horizontal plane (see FIGURE 2*c*), in which the field angle is essentially zero. To better understand that the field is very small in this horizontal plane, one may apply the principle of reversibility, and note that all rays in the horizontal plane converge to a single point (in that plane) in FIGURE 2*c*. Thus, only rays leaving point 40' (reversing their direction) need be operated on by the cylindrical power of lens 52. Using the same reversing of rays in FIGURE 1*b*, it is noted that the power of cylindrical lens 32 must there operate on rays originating from many spaced points (e.g., 40 and 41) so that the entire length of the slit (or the analogous height of the object 20) which subtends a substantial field angle at the cylindrical lens, must be operated on by the power of the cylinder.

Since many other embodiments and uses of the invention are both obvious and possible, the invention is not limited to the illustrated environment or use. Also, the cylindrical component (52) may be behind rather than in front of the spherical component (54), for example. Similarly, the specific example of an exact lens form is intended to be merely illustrative of the advantageous symmetry (in the spherical elements) and the resulting advantages in eliminating aberrations, which are additional advantageous results occasioned by the invention. Accordingly, the invention is not limited to either the specific environment or use, illustrated in FIGURES 2*a* through 2*c* or to the specific form of FIGURE 3, but rather is defined solely by the scope of the appended claims.

As used in the following claims, the term "quasi-spherical" (as applied to an optical component) means that each of the optical surfaces thereof is a surface of revolution formed by (revolving about an axis) either a perfectly circular arc (i.e., part of a perfect circle) or an arc that departs from being perfectly circular only by very small, smooth undulations (i.e., a slightly figured" circular arc). Thus "quasi-spherical" components are made up wholly of spherical or aspheric (i.e., originally spherical surfaces that have been slightly figured) surfaces, each of which type of surface may also be aptly termed "quasi-spherical". Components having cylindrical surfaces (and such cylindrical surfaces themselves) clearly fall outside of the term "quasi-spherical", since cylindrical surfaces are necessarily generated by revolving a straight line about a (parallel) axis.

I claim:

1. An optical system having cylindrical properties for use in an environment in which the cylindrical power desired is in a first plane for which the field angle requirement is large relative to the field angle requirement in the second plane perpendicular thereto, comprising:

a cylindrical component having its cylindrical power in said second perpendicular plane and of a type substantially equal to but opposite in sign to that desired;

and a quasi-spherical component having a dioptric power substantially equal to but opposite to that of said cylindrical component;

so that the result is cylindrical power of the desired amount in said first desired plane while avoiding the use of any cylindrical element having its power in a plane having a relatively large field angle requirement.

2. An optical system according to claim 1, in which:
said cylindrical component is a doublet;
so that said cylindrical component is highly corrected for the relatively narrow field utilized.

3. An optical system for forming a highly corrected flat astigmatic image of an object which subtends a large field angle in a first plane and a much smaller field angle in a second plane perpendicular thereto, wherein the image is formed in said first plane, comprising in optical alignment;
a negative cylindrical component having its cylindrical power in said second plane;
a first quasi-spherical component of positive dioptric power substantially equal, except as to sign, to the cylindrical power of said cylindrical component;
the combined effect of said cylindrical and said first quasi-spherical component being to collimate light rays in said first plane from an object in the front focal plane of said first quasi-spherical component and to have substantially no effect on rays contained in said second plane, so as to act as a cylindrical lens with a positive power in said first plane;
and a second positive quasi-spherical component;
said system therefore forming discrete images of the different points of said object contained in said first plane, while converging all the light in said second plane leaving said object parallel to the optical axis of said system to a single point.

4. An optical system according to claim 3, in which:
said first and second quasi-spherical components are identical and spaced apart a distance equal to twice their common focal length;
so that the various lateral aberrations introduced by one are balanced by the other.

5. An optical system for forming a highly corrected astigmatic image of an object which subtends a relatively large field angle in a first plane and a much smaller field angle in a second plane perpendicular thereto, wherein the image is formed in said first plane, comprising in optical alignment:
a negative cylindrical component, having its cylindrical power in said second plane, comprising a cylindrical biconcave element having surfaces 1 and 2 and a cylindrical plano-concave element having surfaces 3 and 4;
a first quasi-spherical triplet of positive dioptric power substantially equal to but opposite in sign to the cylindrical power of said cylindrical component, comprising a first negative meniscus element having surfaces 5 and 6, a central biconvex element having surfaces 7 and 8, and a second negative meniscus element, identical to said first negative meniscus element but oppositely oriented, having surfaces 9 and 10;
and a second quasi-spherical triplet, identical to said first quasi-spherical triplet, in which the corresponding surfaces of the identical elements are designated 5' through 10';
said optical system having a form exemplified by the following relative surface radii of curvature, element thicknesses and spacing for a refractive material having an index of refraction of 1.62 for the particular wave length of monochromatic light for which it is intended to be used:

Surface 10 to surface 5'=1,069.2
Back focal length=534.6

| Surface | Radius | Glass Thickness | Air Spacing |
|---|---|---|---|
| CYLINDRICAL | | | |
| 1 | −290.97 | 12.2 | |
| 2 | +197.14 | | 0.6 |
| 3 | +194.07 | 12.2 | |
| 4 | (plane) | | 34.6 |
| QUASI-SPHERICAL | | | |
| 5 (5') | [1] −135.71 | 37.3 | |
| 6 (6') | [2] −160.45 | | 0.1 |
| 7 (7') | [2] +617.83 | 18.1 | |
| 8 (8') | [2] −617.83 | | 0.1 |
| 9 (9') | [2] +160.45 | 37.3 | |
| 10 (10') | [1] +135.71 | | |

[1] Approximate radius, modified by figuring.
[2] Spherical.

in which surfaces 5, 5', 10, 10' of each of said quasi-spherical triplets are figured so as to be aspheric surfaces.

6. An optical system according to claim 5, in which:
the first aspheric surfaces (5, 5') of the first negative meniscus elements of both of said quasi-spherical triplets substantially conform to the equation:

$$x=-135.71+\sqrt{(135.71)^2-y^2}-9.354\times10^{-11}y^4+4.306\times10^{-14}y^6+5.177\times10^{-19}y^8$$

wherein $x$ is the Cartesian coordinate measured along the optical axis, and $y$ is the coordinate perpendicular to the optical axis of the surfaces 5, 5', so that $x$ and $y$ both equal 0 where the optical axis intersects the center of the surfaces;
and the second aspheric surfaces (10, 10') of the second negative meniscus elements of both said quasi-spherical triplets substantially conform to the equation:

$$x'=+135.71-\sqrt{(135.71)^2-y^2}+9.354\times10^{-11}y^4-4.306\times10^{-14}y^6-5.177\times10^{-19}y^4$$

wherein $x'$ is the Cartesian coordinate measured along the optical axis, and $y$ is the coordinate perpendicular to the optical axis of the surfaces 10, 10', so that $x'$ and $y$ both equal 0 where the optical axis intersects the center of the surfaces.

References Cited by the Examiner

UNITED STATES PATENTS 1,971,457 8/1934 Maurer.

FOREIGN PATENTS 820,972 9/1959 Great Britain.

DAVID H. RUBIN, *Primary Examiner.*

JEWELL H. PEDERSEN, J. K. CORBIN, R. STERN, *Assistant Examiners.*